(12) United States Patent
Kobashi

(10) Patent No.: US 11,842,109 B2
(45) Date of Patent: Dec. 12, 2023

(54) INFORMATION PROCESSING APPARATUS AND METHOD OF CONTROLLING SAME

(71) Applicant: CANON KABUSHIKI KAISHA, Tokyo (JP)

(72) Inventor: Kazufumi Kobashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/512,499

(22) Filed: Oct. 27, 2021

(65) Prior Publication Data

US 2022/0137901 A1    May 5, 2022

(30) Foreign Application Priority Data

Nov. 2, 2020 (JP) ................................ 2020-183453

(51) Int. Cl.
*G06F 3/12* (2006.01)
(52) U.S. Cl.
CPC .......... *G06F 3/1256* (2013.01); *G06F 3/1205* (2013.01); *G06F 3/1208* (2013.01); *G06F 3/1262* (2013.01)

(58) Field of Classification Search
CPC .... G06F 3/1256; G06F 3/1205; G06F 3/1208; G06F 3/1262
See application file for complete search history.

(56) References Cited

U.S. PATENT DOCUMENTS

| | | | |
|---|---|---|---|
| 2006/0050307 A1* | 3/2006 | Koike | H04N 1/00053 358/1.15 |
| 2021/0224003 A1* | 7/2021 | Shibano | G06F 3/1208 |
| 2021/0405944 A1* | 12/2021 | Kawano | G06F 3/121 |
| 2022/0113916 A1* | 4/2022 | Yasukaga | G06F 3/1284 |

FOREIGN PATENT DOCUMENTS

JP          5846180 B2      1/2016

* cited by examiner

*Primary Examiner* — Helen Zong
(74) *Attorney, Agent, or Firm* — Canon U.S.A., Inc. IP Division

(57) ABSTRACT

In a case of performing test print of a specified print job, an information processing apparatus displays information on a print property to be changed from the specified print job in the test print and causes an operator to confirm the information, generates a test print job obtained by changing the print property of the specified print job, and transmits the generated test print job to an image forming apparatus.

17 Claims, 18 Drawing Sheets

FIG.6

| JOB ID | ORDER NUMBER | MERGED DOCUMENT NUMBER | MERCHANDISE NAME | NUMBER OF COPIES | CONTENT NAME | ORDER RECEPTION DATE | SCHEDULED DISPATCH DATE |
|---|---|---|---|---|---|---|---|
| 0001 | 0001-200620 | 123-210 | SADDLE STITCHED_A4_TWO-SIDED_LANDSCAPE | 100 | abc.pdf | 2020/6/20 | 2020/6/23 |
| 0002 | 0002-200620 | 501-020 | SINGLE SHEET_A5_ONE-SIDED_LANDSCAPE | 250 | qwer.pdf | 2020/6/20 | 2020/6/25 |
| 0003 | 0002-200621 | 253-040 | 2Up_FINISHED_A4_TWO-SIDED_PORTRAIT | 80 | poiuy.pdf | 2020/6/21 | 2020/6/26 |
| ... | ... | ... | ... | ... | ... | ... | ... |
| ... | ... | ... | ... | ... | ... | ... | ... |

FIG.7

| MERCHANDISE NAME | OUTPUT SHEET SIZE | FINISHED SHEET SIZE | PAPER TYPE | ORIENTATION | ONE-SIDED/ TWO-SIDED | STAPLING | PUNCHING | FOLDING | BOOKBINDING | SADDLE STITCHING | CUTTING | PAPER DISCHARGE DESTINATION |
|---|---|---|---|---|---|---|---|---|---|---|---|---|
| SADDLE_STITCHED_A4_ TWO-SIDED_LANDSCAPE | 320 × 450 | 210 × 297 | FINE QUALITY PAPER | PORTRAIT | TWO-SIDED | — | — | — | ON | ON | ON | AUTO |
| SINGLE_SHEET_A5_ ONE-SIDED_LANDSCAPE | 210 × 148.5 | — | COATED PAPER | LANDSCAPE | ONE-SIDED | — | — | — | — | — | — | AUTO |
| 2Up_FINISHED_A4_ TWO-SIDED_PORTRAIT | 320 × 450 | 210 × 297 | COATED PAPER | PORTRAIT | TWO-SIDED | — | — | — | — | — | ON | AUTO |
| ... | ... | ... | ... | ... | ... | ... | ... | ... | ... | ... | ... | ... |
| ... | ... | ... | ... | ... | ... | ... | ... | ... | ... | ... | ... | ... |

FIG.8

| PRINT SETTING | | MERCHANDISE NAME | | | | |
|---|---|---|---|---|---|---|
| | | SADDLE STITCHED_A4_TWO-SIDED_LANDSCAPE | SINGLE SHEET_A5_ONE-SIDED_LANDSCAPE | 2Up_FINISHED A4_TWO-SIDED_PORTRAIT | ... | ... |
| | PAGE | — | — | — | — | — |
| | SHEET SIZE | — | — | — | — | — |
| | PAPER TYPE | — | — | — | — | — |
| | PRINTING METHOD (ONE-SIDED/TWO-SIDED/BOOKBINDING) | — | — | — | — | — |
| | STAPLING | — | — | — | — | — |
| | PUNCHING | — | — | — | — | — |
| | SADDLE STITCHING | — | — | — | — | — |
| | FOLDING | — | — | — | — | — |
| | CASE BOOKBINDING | — | — | — | — | — |
| | CUTTING (TOP AND BOTTOM/FORE-EDGE) | — | — | OFF | — | — |

FIG.9

TEST PRINT

SOME PRINT SETTING OF SELECTED JOB IS CHANGED
AND TEST PRINT IS EXECUTED.

SETTING TO BE CHANGED

| PRINT SETTING | VALUE TO BE CHANGED |
|---|---|
| CUTTING (TOP AND BOTTOM/FORE-EDGE) | OFF |

901

| OK | CANCEL | EXECUTE WITHOUT SETTING CHANGE |

| | | COLOR | FRONT-BACK MISALIGNMENT | DOCUMENT POSITION | BINDING MARGIN | CREEP CORRECTION | FOLDING POSITION | CUTTING POSITION | SPINE WIDTH |
|---|---|---|---|---|---|---|---|---|---|
| PRINT SETTING | PAGE | SPECIFIC | SPECIFIC | SPECIFIC | SPECIFIC | — | SPECIFIC | — | — |
| | SHEET SIZE | — | — | — | — | — | — | — | — |
| | PAPER TYPE | — | LOW QUALITY | LOW QUALITY | LOW QUALITY | — | — | — | — |
| | PRINTING METHOD (ONE-SIDED/TWO-SIDED/ BOOKBINDING) | ONE-SIDED | — | — | — | — | — | — | N/A |
| | STAPLING | OFF | OFF | OFF | — | N/A | OFF | — | N/A |
| | PUNCHING | OFF | OFF | OFF | — | N/A | OFF | — | N/A |
| | SADDLE STITCHING | OFF | OFF | — | — | — | — | — | — |
| | FOLDING | OFF | OFF | — | — | N/A | N/A | — | N/A |
| | CASE BOOKBINDING | OFF | OFF | OFF | OFF | OFF | N/A | — | — |
| | CUTTING (TOP AND BOTTOM/FORE-EDGE) | OFF | OFF | OFF | OFF | OFF | N/A | — | OFF |

FIG.12A

```
TEST PRINT
■ SELECTED JOB              ■ ITEM TO BE CONFIRMED      ■ TEST PRINT JOB
· JOB ID ~1201              ☐ COLOR      ~1202
  0001                      ☐ FRONT-BACK MISALIGNMENT
                            ☐ DOCUMENT POSITION
· JOB SETTING               ☐ BINDING MARGIN
  SHEET SIZE: SRA3          ☐ CREEP CORRECTION
  PAPER TYPE: FINE QUALITY PAPER  ☐ FOLDING POSITION
  PRINTING METHOD: BOOKBINDING    ☐ CUTTING POSITION
  SADDLE STITCHING: ON            ☐ SPINE WIDTH
  CUTTING: ON
                                 [ DETERMINE
                                  CONFIRMATION ITEM ]

[ EXECUTE TEST PRINT ]  [ CACNEL ]  [ EXECUTE WITHOUT SETTING CHANGE ]
```

FIG.12B

```
TEST PRINT
■ SELECTED JOB              ■ ITEM TO BE CONFIRMED      ■ TEST PRINT JOB
· JOB ID            1203─── ☒ COLOR
  0001                      ☐ FRONT-BACK MISALIGNMENT
                            ☐ DOCUMENT POSITION
· JOB SETTING               ☐ BINDING MARGIN
  SHEET SIZE: SRA3          ☐ CREEP CORRECTION
  PAPER TYPE: FINE QUALITY PAPER  ☐ FOLDING POSITION
  PRINTING METHOD: BOOKBINDING    ☐ CUTTING POSITION
  SADDLE STITCHING: ON            ☐ SPINE WIDTH
  CUTTING: ON                              ~1204
                                 [ DETERMINE
                                  CONFIRMATION ITEM ]

[ EXECUTE TEST PRINT ]  [ CACNEL ]  [ EXECUTE WITHOUT SETTING CHANGE ]
```

FIG.13

| PRINT SETTING | | COLOR |
|---|---|---|
| | PAGE | SPECIFIC |
| | SHEET SIZE | — |
| | PAPER TYPE | — |
| | PRINTING METHOD (ONE-SIDED/TWO-SIDED/BOOKBINDING) | ONE-SIDED |
| | STAPLING | OFF |
| | PUNCHING | OFF |
| | SADDLE STITCHING | OFF |
| | FOLDING | OFF |
| | CASE BOOKBINDING | OFF |
| | CUTTING (TOP AND BOTTOM/FORE-EDGE) | OFF |

1302

| | JOB SETTING |
|---|---|
| | 100 |
| | SRA3 |
| | FINE QUALITY PAPER |
| | BOOKBINDING |
| | OFF |
| | OFF |
| | ON |
| | OFF |
| | OFF |
| | ON |

1301

| | TEST PRINT JOB SETTING |
|---|---|
| | 1-2 |
| | SRA3 |
| | FINE QUALITY PAPER |
| | ONE-SIDED |
| | OFF |
| | OFF |
| | OFF |
| | OFF |
| | OFF |
| | OFF |

1303

| PRINT SETTING | | |
|---|---|---|
| | PAGE | |
| | SHEET SIZE | |
| | PAPER TYPE | |
| | PRINTING METHOD (ONE-SIDED/TWO-SIDED/BOOKBINDING) | |
| | STAPLING | |
| | PUNCHING | |
| | SADDLE STITCHING | |
| | FOLDING | |
| | CASE BOOKBINDING | |
| | CUTTING (TOP AND BOTTOM/FORE-EDGE) | |

FIG.14

| TEST PRINT | | |
|---|---|---|
| ■ SELECTED JOB | ■ ITEM TO BE CONFIRMED | ■ TEST PRINT JOB |
| · JOB ID<br>  0001<br><br>· JOB SETTING<br>  SHEET SIZE: SRA3<br>  PAPER TYPE: FINE QUALITY PAPER<br>  PRINTING METHOD: BOOKBINDING<br>  SADDLE STITCHING: ON<br>  CUTTING: ON | □ COLOR<br>□ FRONT-BACK MISALIGNMENT<br>□ DOCUMENT POSITION<br>□ BINDING MARGIN<br>☒ CREEP CORRECTION — 1401<br>□ FOLDING POSITION<br>☒ CUTTING POSITION<br>□ SPINE WIDTH — 1402<br><br>[DETERMINE CONFIRMATION ITEM] | ☒ 1 CONFIRMATION ITEM — 1403<br>CREEP CORRECTION<br>· JOB NAME<br>  0001_Test CREEP<br><br>☒ 2 CONFIRMATION ITEM — 1404<br>CUTTING POSITION<br>· JOB NAME<br>  0001_Test CUTTING<br><br>ADVANCED SETTING DISPLAY<br>— 1405 |
| [EXECUTE TEST PRINT] | [CACNEL] | [EXECUTE WITHOUT SETTING CHANGE] |

FIG.16A

TEST PRINT

- SELECTED JOB
  - JOB ID
    0001
  - JOB SETTING
    SHEET SIZE: SRA3
    PAPER TYPE: FINE QUALITY PAPER
    PRINTING METHOD: BOOKBINDING
    SADDLE STITCHING: ON
    CUTTING: ON

- ITEM TO BE CONFIRMED
  - ☒ COLOR — 1601
  - ☒ FRONT-BACK MISALIGNMENT — 1602
  - ☐ DOCUMENT POSITION
  - ☐ BINDING MARGIN
  - ☐ CREEP CORRECTION
  - ☐ FOLDING POSITION
  - ☐ CUTTING POSITION
  - ☐ SPINE WIDTH

[DETERMINE CONFIRMATION ITEM]

- TEST PRINT JOB
  - ☒ 1 CONFIRMATION ITEM — 1603
    COLOR
    · JOB NAME
      0001_Test COLOR
  - ☒ 2 CONFIRMATION ITEM — 1604
    FRONT-BACK MISALIGNMENT
    · JOB NAME
      0001_Test FRONT AND BACK

ADVANCED SETTING DISPLAY
  [COMBINE TEST PRINT] — 1605

[EXECUTE TEST PRINT] [CACNEL] [EXECUTE WITHOUT SETTING CHANGE]

FIG.16B

TEST PRINT

- SELECTED JOB
  - JOB ID
    0001
  - JOB SETTING
    SHEET SIZE: SRA3
    PAPER TYPE: FINE QUALITY PAPER
    PRINTING METHOD: BOOKBINDING
    SADDLE STITCHING: ON
    CUTTING: ON

- ITEM TO BE CONFIRMED
  - ☒ COLOR
  - ☒ FRONT-BACK MISALIGNMENT
  - ☐ DOCUMENT POSITION
  - ☐ BINDING MARGIN
  - ☐ CREEP CORRECTION
  - ☐ FOLDING POSITION
  - ☐ CUTTING POSITION
  - ☐ SPINE WIDTH

[DETERMINE CONFIRMATION ITEM]

- TEST PRINT JOB
  - ☒ 1 CONFIRMATION ITEM — 1606
    COLOR, FRONT AND BACK
    · JOB NAME
      0001_Test COLOR_ FRONT AND BACK

1607
  ADVANCED SETTING DISPLAY
  [COMBINE TEST PRINT]

[EXECUTE TEST PRINT] [CACNEL] [EXECUTE WITHOUT SETTING CHANGE]

INFORMATION PROCESSING APPARATUS AND METHOD OF CONTROLLING SAME

BACKGROUND

Field of the Disclosure

The present disclosure relates to a test print function in a printing system.

Description of the Related Art

In commercial printing, there is a "test print function" that executes printing by changing the number of copies to one while maintaining the same print setting (print property) as that used in an actual printing. By using a print product output by the test print function, a print operator can confirm, for example, printing quality, page layout, and accuracy of post-processing. Based on the confirmed result, the print operator corrects the print data or adjusts various printing devices (e.g., a printer, and a post-processing machine), and executes "actual printing".

By using such test print function, it is possible to prevent a printing mistake to be found at the time of actual printing in advance and to prevent occurrence of a large amount of waste paper sheets.

In the test print described above, however, it may be rather difficult to confirm the page layout or the accuracy of post-processing if a print product output under the same print setting as in the actual printing is used. For example, in a case of an output product of "bookbinding saddle stitching" and "top and bottom/fore-edge cutting", it may be difficult to confirm the layout position (misalignment) of the page if the output product after cutting is used. That is, the layout position (misalignment) of the page may be more easily confirmed in the state before cutting.

There may thus be a case of usage in which cutting is temporarily canceled from the print setting, test print is executed, and confirmation is performed. In this case, it is required to perform an operation of setting cutting again (resetting of the print property) at the time of actual printing. Thus, the burden on the print operator increases, and an error such as forgetting of resetting may easily occur.

Japanese Patent No. 5846180 discusses a technique that enables output in a work-in-process state in which some post-processing has been performed in test print.

Japanese Patent No. 5846180 can output a print product in a work-in-process state in which settings of some post-processing has been changed in test print. This technique, however, cannot control the items of print settings to be changed according to the type of print settings of the output product and the item (e.g., printing quality, page layout shift, and cutting position) desired to be confirmed by the print operator in test print.

Furthermore, the print operator cannot confirm the content of the print settings to be changed at the time of executing the test print. There is therefore a possibility that the operator erroneously determines that it is a printing mistake by confusion with test print (hereinafter referred to as "normal test print") of the same print setting as the actual printing (the print setting is not changed).

SUMMARY

The present disclosure is directed to providing a mechanism that enables to confirm and execute test print automatically changed to an optimum print property according to a type of print property of an output product to be printed and an item desired to be confirmed by an operator and suppresses an error such as forgetting of resetting and erroneous determination of the operator.

According to an aspect of the present disclosure, an information processing apparatus includes a generation unit configured to generate a second print job obtained by changing a print property of a first print job in a case of performing test print performed to confirm an output result in a case where the first print job is executed by an image forming apparatus, a display unit configured to display information on a print property to be changed when the generation unit generates the second print job, and a transmission unit configured to transmit the second print job generated by the generation unit to the image forming apparatus.

Further features of the present disclosure will become apparent from the following description of exemplary embodiments with reference to the attached drawings.

BRIEF DESCRIPTION OF THE DRAWINGS

FIG. 6 is a diagram illustrating a print job information table stored in print job information data.

FIG. 7 is a diagram illustrating a merchandise information table stored in print job information data.

FIG. 8 is a diagram illustrating a test print control table stored in test print control data according to one or more aspects of the present disclosure.

FIG. 9 is a diagram illustrating a test print confirmation message according to one or more aspects of the present disclosure.

FIG. 11 is a diagram illustrating a test print control table for confirmation items stored in test print control data according to one or more aspects of the present disclosure.

FIGS. 12A to 12C are diagrams illustrating a test print confirmation item setting screen according to one or more aspects of the present disclosure.

FIG. 13 is a diagram illustrating a processing example of changing print setting of test print according to a confirmation item according to one or more aspects of the present disclosure.

FIG. 14 is a diagram illustrating an example of a test print confirmation item setting screen in a case where a plurality of confirmation items is specified according to one or more aspects of the present disclosure.

FIGS. 16A and 16B are diagrams illustrating a test print confirmation item setting screen according to one or more aspects of the present disclosure.

DESCRIPTION OF THE EMBODIMENTS

Hereinafter, exemplary embodiments of the present disclosure will be described with reference to the drawings.

Figure 1:
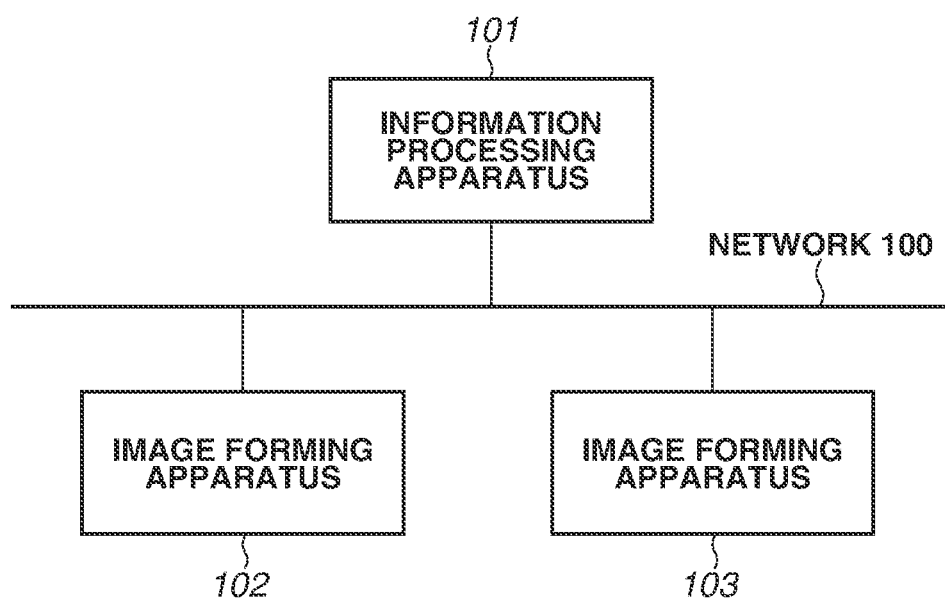
FIG. 1 is a block diagram of an image forming system according to one or more aspects of the present disclosure.

FIG. 1 is a block diagram illustrating an example of a configuration of an image forming system according to a first exemplary embodiment of the present disclosure.

The system configuration of the present exemplary embodiment includes an information processing apparatus 101 and image forming apparatuses 102 and 103. The information processing apparatus 101 and the image forming apparatuses 102 and 103 are communicably connected to each other via a network 100.

The image forming apparatuses 102 and 103 analyze print data transmitted from the information processing apparatus 101, convert the print data into dot images page by page, and print the dot images. The image forming apparatuses 102 and 103 can be mounted with a finisher configured to perform post-processing, such as stapling, punching, folding, bookbinding, and cutting, to the print product. The print product can be output in a state where various types of post-processing are performed together with printing.

FIG. 1 illustrates an example in which one information processing apparatus and two image forming apparatuses are connected. However, another configuration may be adopted as long as the image forming apparatus processes the print data. For example, print data from a plurality of information processing apparatuses may be processed by one image forming apparatus. Alternatively, an external controller (not illustrated) may be connected to the image forming apparatus, and the external controller may be configured to perform processing of the print data as the information processing apparatus without interposing the information processing apparatus. The network 100 is, for example, a local area network (LAN), an intranet, or the Internet, and may be wired or wireless.

Figure 2:
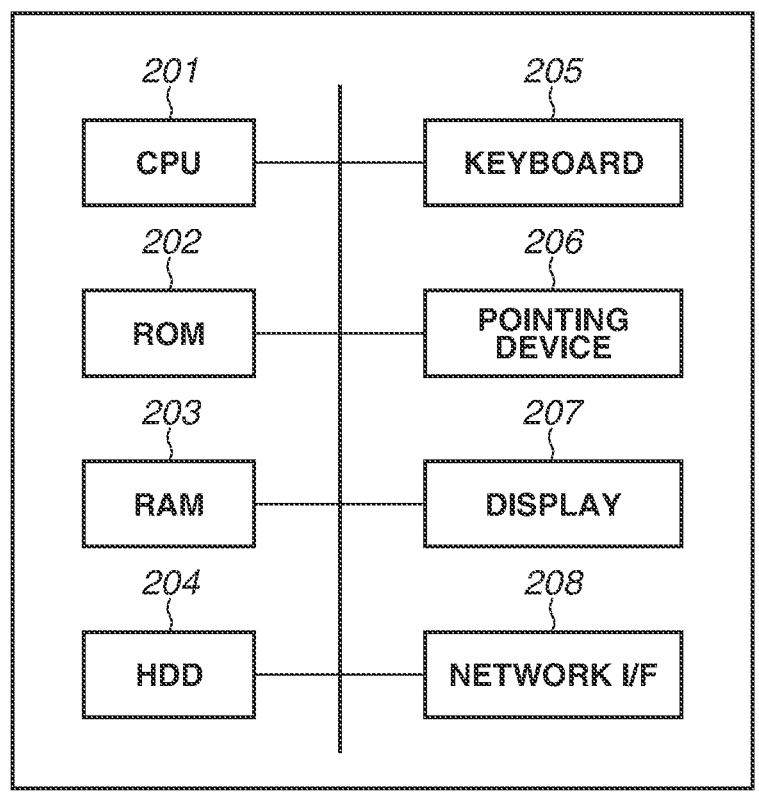
FIG. 2 is a hardware block diagram of an information processing apparatus according to one or more aspects of the present disclosure.

FIG. 2 is a block diagram illustrating an example of a hardware configuration of the information processing apparatus 101.

A central processing unit (CPU) 201 reads a control program stored in a read only memory (ROM) 202 or a hard disk drive (HDD) 204 and executes various types of control processing. A random access memory (RAM) 203 is used as a temporary storage area, such as a main memory and a work area of the CPU 201. The HDD 204 stores image data and various programs. Instead of or in combination with the hard disk drive, another storage apparatus such as a solid state drive (SSD) may be provided.

A keyboard 205 is an input apparatus serving as an instruction input unit, and instructs, for example, a control command instruction, and text input to an application described below. A pointing device 206 is an input apparatus serving as an instruction input unit together with the keyboard 205, and instructs a control command instruction to an application described below.

A display 207 is an output apparatus serving as a display unit, and displays, for example, a command input from the keyboard 205 or the pointing device 206 and a state of an application to be described below. A network I/F 208 connects the information processing apparatus 101 to the network (e.g., local area network (LAN), intranet, and the Internet). The information processing apparatus 101 transmits and receives various types of information to and from other apparatuses on the network using the network I/F 208.

Figure 3:
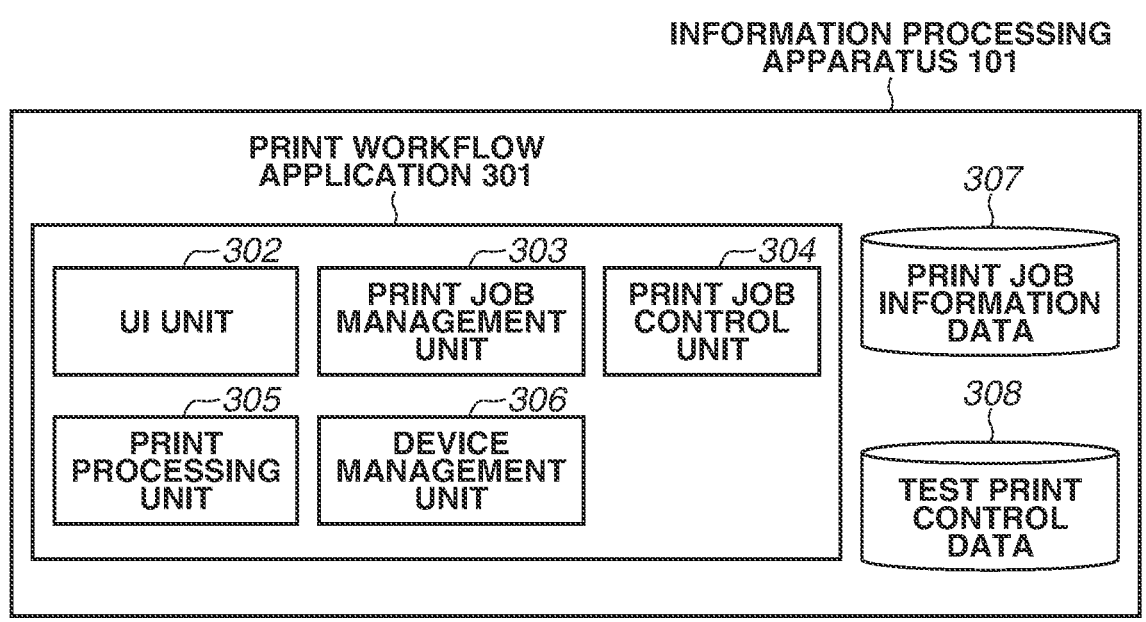
FIG. 3 is a software block diagram of an information processing apparatus one or more aspects of the present disclosure.

FIG. 3 is a block diagram illustrating an example of a software configuration of the information processing apparatus 101.

A print workflow application 301 is a program module installed and operated in the HDD 204 of the information processing apparatus 101, loaded into the RAM 203 at the time of execution, and executed by the CPU 201.

The print workflow application 301 includes a user interface (UI) unit 302, a print job management unit 303, a print job control unit 304, a print processing unit 305, and a device management unit 306.

The UI unit 302 constructs a graphical user interface (GUI), receives various input operations from a user, and performs execution instruction of corresponding processing.

The print job management unit 303 accesses print job information data 307 to be described below, and executes reference to various types of information on a print job to be transmitted to the image forming apparatus by the print workflow application 301.

The print job control unit 304 controls execution of various functions (e.g., transmission, editing, and deletion of print job) for a print job in the print workflow application 301.

The print processing unit 305 transmits the content data and the job ticket data of the print job to the image forming apparatus in response to the print job transmission instruction received from the print job control unit 304.

The device management unit 306 manages various types of information (e.g., identification name, and address) of the image forming apparatus to which the print job is transmitted from the print workflow application 301.

The print job information data 307 is a database that manages information (print job information table and merchandise information table) regarding the print job to be described below. The print job information table will be described below with reference to FIG. 6. The merchandise information table will be described below with reference to FIG. 7.

Test print control data 308 is a database that manages information (test print control table) for controlling print settings in test print processing of the print job to be described below. The test print control table will be described below with reference to FIG. 8. Although details will be described below, in the test print of the present exemplary embodiment, printing can be performed by automatically and appropriately changing print settings (print properties) of a specified print job in order to confirm an output result when the specified print job is executed by the image forming apparatus. The print job control unit 304 can generate a test print job for performing test print for the print job from the specified print job.

The print job information data 307 and the test print control data 308 may be configured to be stored not only in the HDD 204 of the information processing apparatus 101 but also in another information processing apparatus (e.g., a database server (including a cloud server)) connected via a network, as a storage destination.

Figure 4:
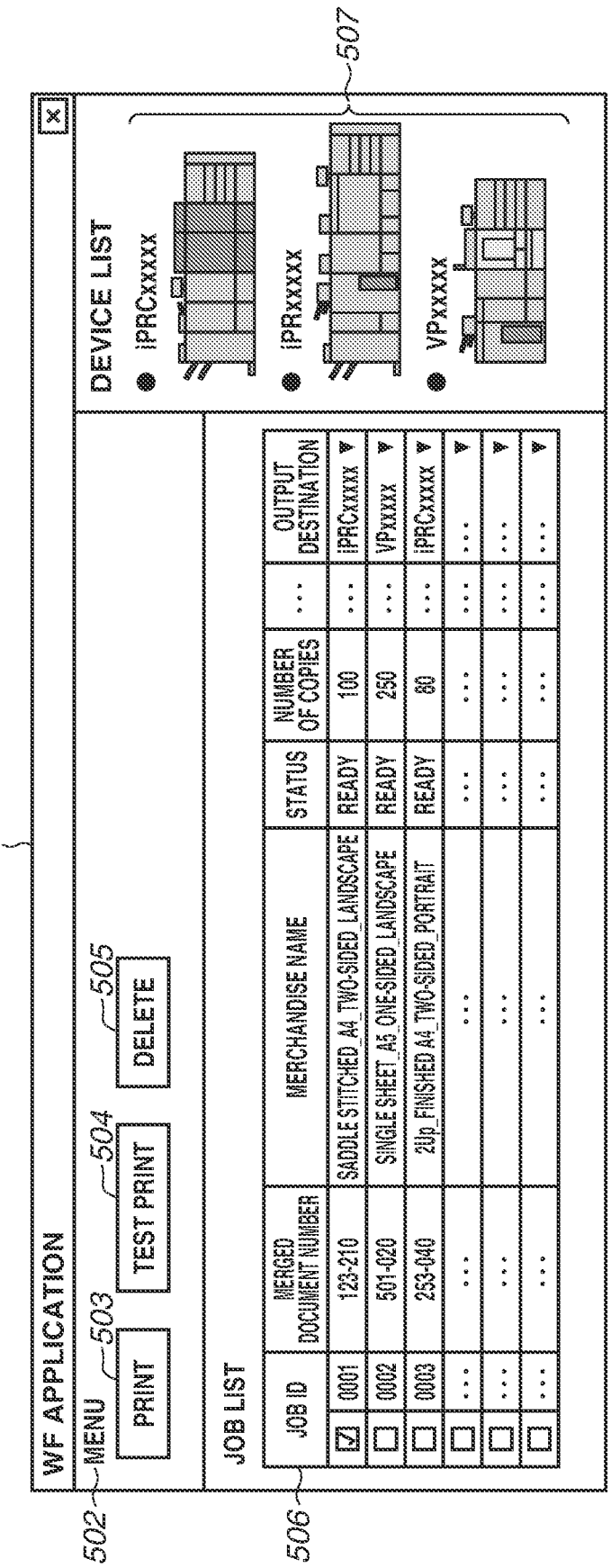
FIG. 4 is a diagram illustrating a print job management screen of a print workflow application.

FIG. 4 is a diagram illustrating an example of a print job management screen of the print workflow application 301.

When the information processing apparatus 101 is instructed to execute the print workflow application 301 by a print operator via the keyboard 205 or the pointing device 206, the CPU 201 loads the program into the RAM 203 and executes the program. The print workflow application 301 is thereby activated. When the print workflow application 301 is activated, the UI unit 302 displays the print job management screen as illustrated in FIG. 4 on the display 207.

A print job management screen 501 indicates a print job management screen in the print workflow application 301. A function menu 502 indicates a menu of functions that can be executed on the print job management screen 501. In the function menu 502, a print button 503, a test print button 504, and a delete button 505 are arranged. The print button 503 is a button for performing a print instruction of a print job (instruction of actual printing). The test print button 504 is a button for performing a test print instruction corresponding to the print job. The delete button 505 is a button for performing a print job deletion instruction. The function menu 502 may include an edit button for performing a print job editing instruction.

A print job list 506 indicates a list displaying a list of print jobs managed by the print workflow application 301. The print workflow application 301 accesses the information on the print job stored in the print job information data 307 via the print job management unit 303, and displays the print job, which is a print target, in the print job list 506. The print operator selects a print job displayed in the print job list 506 with the pointing device 206 or other device, and presses a function button arranged in the function menu 502 to perform a print instruction, a test print instruction, a deletion instruction, or an editing instruction with respect to the print job.

A device list 507 displays a list of image forming apparatuses managed as output destinations by the print workflow application 301. The print workflow application 301 acquires, via the device management unit 306, information about the image forming apparatuses communicably connected via, for example, the network 100, and displays the information in the device list 507.

Figure 5:
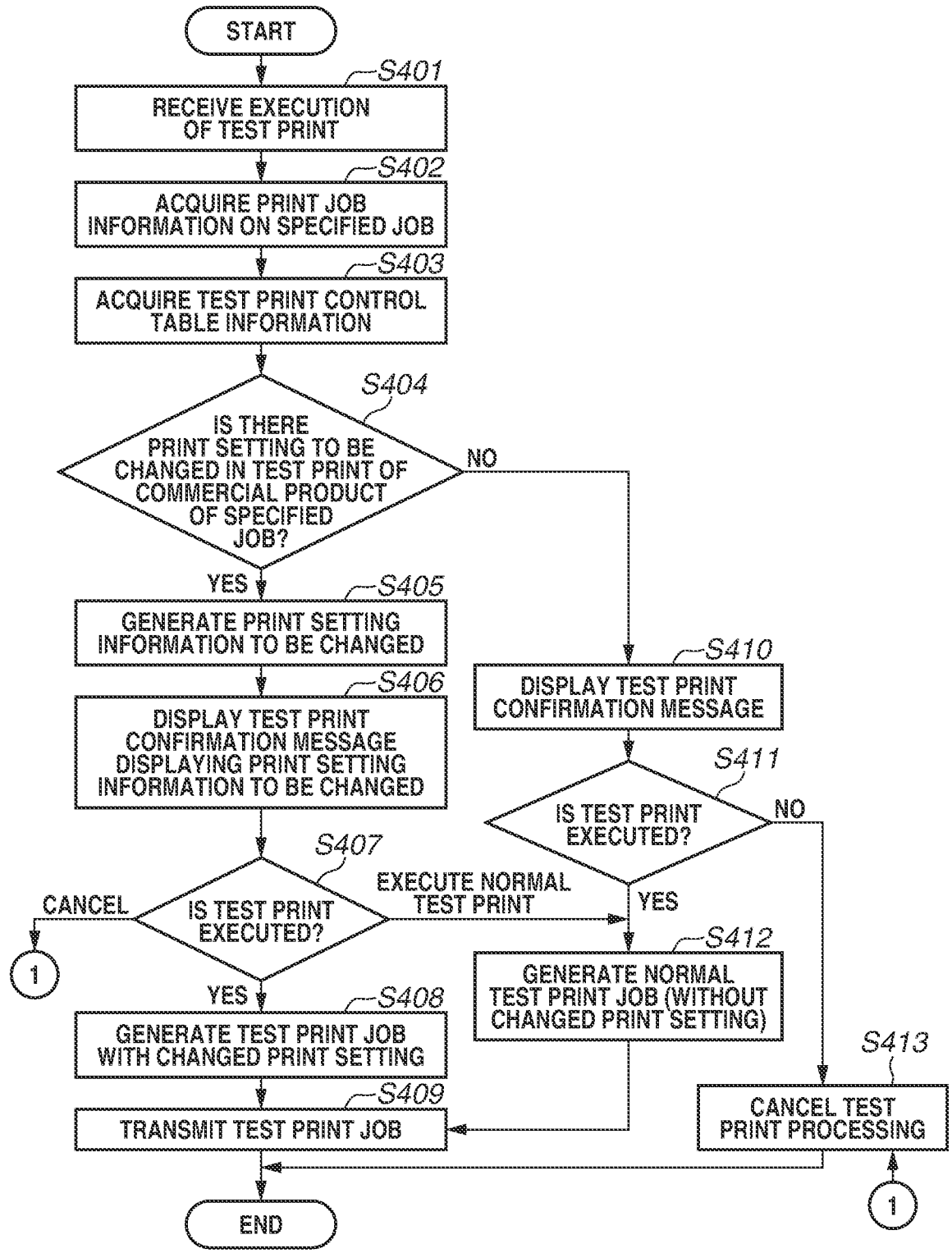
FIG. 5 is a flowchart illustrating test print execution processing according to one or more aspects of the present disclosure.

FIG. 5 is a flowchart illustrating an example of test print execution processing in the print workflow application 301 of the first exemplary embodiment. That is, the processing of the flowchart is realized by the CPU 201 of the information processing apparatus 101 loading the print workflow application 301 stored in the HDD 204 into the RAM 203 as necessary and executing the application.

In step S401, when the UI unit 302 receives the fact that the test print button 504 has been pressed on the keyboard 205 or the pointing device 206 by the print operator, the UI unit 302 informs the print job control unit 304 that test print has been executed.

In step S402, the print job control unit 304 acquires, via the print job management unit 303, information on the print job instructed as a test print target. The print job management unit 303 acquires information on the print job for which test print has been instructed from the print job control unit 304, from the print job information table as illustrated in FIG. 6 or the merchandise information table as illustrated in FIG. 7.

FIG. 6 is a diagram illustrating an example of a print job information table stored in the print job information data 307.

In the example illustrated in FIG. 6, the print job information table includes items such as a job identification data (ID), a merged document number, a merchandise name, the number of copies, a content name, an order reception date, and a scheduled dispatch date. The merchandise name is a value associated with information on detailed print settings (print properties) defined in the merchandise information table illustrated in FIG. 7 described below. The content name is information link to a file name which is content data used at the time of printing the print job.

For example, when test print of a print job having job ID "0001" in the print job list 506 is instructed, the print job management unit 303 acquires information used for printing from the print job information table using the job ID "0001" as a key. In the example illustrated in FIG. 6, the print job management unit 303 uses the job ID "0001" as a key to acquire, for example, "saddle stitched_A4_two-sided_landscape" as the merchandise name, and "abc.pdf" as the content name.

FIG. 7 is a diagram illustrating an example of a merchandise information table stored in the print job information data 307.

In the merchandise information table, detailed setting values are defined, such as output sheet size, finished sheet size, paper type, orientation, one-sided/two-sided, stapling, punching, folding, bookbinding, cutting, and paper discharge destination. The merchandise information table is created in advance by an installation staff in charge such as a system engineer (SE) at the time of installing the print workflow application 301 according to the order content of the print product handled by the print workflow application 301. The print job management unit 303 acquires detailed print settings from the merchandise information table using the aforementioned merchandise name as a key. For example, when the merchandise name is "saddle stitched_A4_two-sided_landscape", the settings to be acquired include "320×450" for output sheet size, "fine quality paper" for paper type, . . . , "two-sided" for one-sided/two-sided, . . . , "ON" for bookbinding, "ON" for saddle stitching, and "ON" for cutting.

In step S403, the print job control unit 304 acquires test print control data as illustrated in FIG. 8 via the print job management unit 303.

FIG. 8 is a diagram illustrating an example of a test print control table stored in the test print control data 308 of the first exemplary embodiment.

The test print control table defines print settings to be changed at the time of test print for each merchandise name. In the example of FIG. 8, it is defined that there is no print setting to be changed ("–" in the table means no change from the original print setting) regarding the merchandise name "single sheet_A5_one-sided_landscape". It is also defined that "cutting (top and bottom/fore-edge)" is changed to "OFF" regarding the merchandise name "saddle stitched_A4_two-sided_landscape".

In step S404, the print job control unit 304 determines whether there is a print setting to be changed in test print regarding the print job for which test print is instructed in step S401 described above. In detail, the print job control unit 304 uses, regarding the print job specified in step S401, the information on the print job acquired in step S402 and the test print control table information acquired in step S403 to determine whether there is a print setting to be changed at the time of test print of the print job.

If the specified print job has, for example, the job ID "0001", the corresponding merchandise name "saddle stitched_A4_two-sided_landscape" is acquired from the print job information table, and data of the merchandise name "saddle stitched_A4_two-sided_landscape" is acquired from the test print control table. Since it is defined in the merchandise name "saddle stitched_A4_two-sided_landscape" of the test print control table that the print setting "cutting (top and bottom/fore-edge)" is changed to "OFF", the print job control unit 304 determines that there is a print setting to be changed at the time of test print. In contrast, in a case of a print job corresponding to the merchandise name "single sheet_A5_one-sided_landscape", the print setting to be changed is not defined in the test print control table, and thus the print job control unit 304 determines that there is no print setting to be changed at the time of test print.

If there is no print setting to be changed in step S404 described above (NO in step S404), the print job control unit 304 causes the processing to proceed to step S410. The processing in step S410 and subsequent steps will be described below.

In contrast, if there is a print setting to be changed (YES in step S404), the print job control unit 304 causes the processing to proceed to step S405.

In step S405, the print job control unit 304 generates a changed print setting for test print. In a case of a print job having job ID "0001", the print job control unit 304 generates a print setting in which "cutting (top and bottom/fore-edge)" is changed to "OFF" from the print setting defined by the merchandise name "saddle stitched_A4_two-sided_landscape" in the merchandise table.

In step S406, the print job control unit 304 displays a confirmation message displaying information on a print setting to be changed at the time of test print. The print job control unit 304 displays, on the display 207, via the UI unit 302, the information on the print setting generated in step S405 described above (here, the information on the changed print setting) together with the test print confirmation message, as illustrated in, for example, FIG. 9. In the example illustrated in FIG. 9, in particular, information on a print setting to be changed in test print is displayed, but a print setting not to be changed may also be displayed.

FIG. 9 is a diagram illustrating an example of a test print confirmation message according to the first exemplary embodiment.

A list view 901 displays a list of print settings to be changed at the time of test print. In the example in FIG. 9, it is displayed that "cutting (top and bottom/fore-edge)" is changed to "OFF".

An OK button 902 is a button for allowing the print setting to be changed and executing test print. A cancel button 903 is a button for canceling execution of test print. An execute button 904 is a button for executing test print without changing the setting with print settings equivalent to those of the actual printing without changing the print settings.

In step S407, the print job control unit 304 determines whether to execute test print. When the OK button 902 is pressed (YES in step S407), the print job control unit 304 determines to execute test print with changed print settings, and the processing proceeds to step S408.

In step S408, the print job control unit 304 generates a test print job with changed print settings. Specifically, the print job control unit 304 generates a job ticket on the basis of the information on the print setting generated in step S405 described above. Since it is test print, the number of copies of a job ticket is set to "1". The job ticket is data describing print settings, such as an output sheet size, a finished sheet size, a paper type, an orientation, one-sided/two-sided, stapling, punching, folding, bookbinding, cutting, a paper discharge destination, and the number of copies, and is used to give a notification of print settings for each job.

In step S409, the print processing unit 305 transmits a print job of test print to the image forming apparatus. Specifically, the print processing unit 305 transmits the job ticket generated in step S408 described above and the content data of the print job for which test print is instructed to the image forming apparatus, and ends the processing of this flowchart.

When the execute button 904 is pressed without changing the setting in the test print confirmation message displayed in step S406 described above, the print job control unit 304 determines that normal test print without changed print settings is executed, and the processing proceeds to step S412.

In step S412, the print job control unit 304 generates a normal test print job without changed print settings. Specifically, the print job control unit 304 generates a job ticket in which the number of copies is set to 1 using the print settings defined in the merchandise information table of the job ID of the print target. In step S409, the print job control unit 304 transmits a normal test print job without changed print settings using the job ticket generated in step S412 described above, and the processing of the flowchart ends.

If the cancel button 903 is pressed in the test print confirmation message displayed in step S406 described above, the print job control unit 304 determines that it is a cancel instruction for the test print, and the processing proceeds to step S413. In step S413, the print job control unit 304 cancels the execution of the test print, and the processing of the flowchart ends.

Hereinafter, a case where it is determined in step S404 that there is no print setting to be changed in test print and the processing proceeds to step S410 described above will be described.

In step S410, the print job control unit 304 displays a confirmation message of the test print. Here, the print job control unit 304 is a confirmation message for normal test print without changed print settings. Thus, in step S410, the list view 901 of the print settings to be changed of the test print confirmation message illustrated in FIG. 9 and a confirmation message of a state in which the execute button 904 is not displayed without changing the settings are displayed. In this confirmation message, execution of normal test print is instructed when the OK button 902 is pressed.

In step S411, the print job control unit 304 determines whether to execute test print. When the OK button 902 is pressed in the test print confirmation message displayed in step S406 described above, the print job control unit 304 determines that normal test print is to be executed (YES in step S411), and the processing proceeds to step S412. In step S412, the print job control unit 304 generates a normal test print job without changed print settings. In step S409, the print job control unit 304 transmits a normal test print job without changed print settings using the job ticket generated in step S412 described above, and the processing of this flowchart ends.

If the cancel button 903 is pressed in the test print confirmation message displayed in step S410 described above, the print job control unit 304 determines that it is a cancel instruction for the test print (NO in step S411), and the processing proceeds to step S413. In step S413, the print job control unit 304 cancels the execution of the test print, and ends the processing of this flowchart.

By executing the above-described processing, the test print can be executed after confirmation of the items of the print settings to be changed in a case where test print with changed print settings is executed in the print job in which specific print settings are set. For example, in a case where test print is executed by changing the setting to not execute cutting for a print job for performing bookbinding saddle stitching cutting, the test print can be executed after confirming that the setting is changed to not execute cutting. It is thereby possible to suppress the occurrence of a situation in which a printing mistake is determined by being confused with normal test print, and the print operator can easily check the layout position of the page using the output product of the test print. It is also not necessary to perform test print by canceling specific print settings such as cutting from the print settings, or it is not necessary to restore the print settings at the time of actual printing, and it is possible to reduce the burden on the print operator and prevent a mistake such as forgetting of resetting.

In this flowchart, an example of test print of a single print job is indicated. However, test print of a plurality of print jobs may be instructed (the test print button 504 may be instructed in a state where a plurality of print jobs is selected in the print job list 506), and it may be determined whether it is necessary to change the print settings so that test print with changed print settings can be transmitted.

Instead of displaying the content of the print setting changed in the test print on the screen of the test print confirmation message, another method, such as preparing a screen different from the confirmation message, may be used to notify the print operator.

The case where the number of copies of the job ticket of the test print job is set to "1" has been described. However, the number of copies of the job ticket of the test print job may be set to other than "1".

In the first exemplary embodiment described above, the print setting to be changed at the time of test print is defined for each merchandise name in the test print control table illustrated in FIG. 8. In contrast, in a second exemplary embodiment, the print setting to be changed at the time of test print is defined for each confirmation item that can be confirmed using the output product of the test print. The test print is executed by automatically changing the print setting to the optimum print setting according to the item to be confirmed using the output product of the test print selected by the print operator. Details will now be described. Here, description of the configuration identical to that of the first exemplary embodiment will be omitted.

Figure 10:
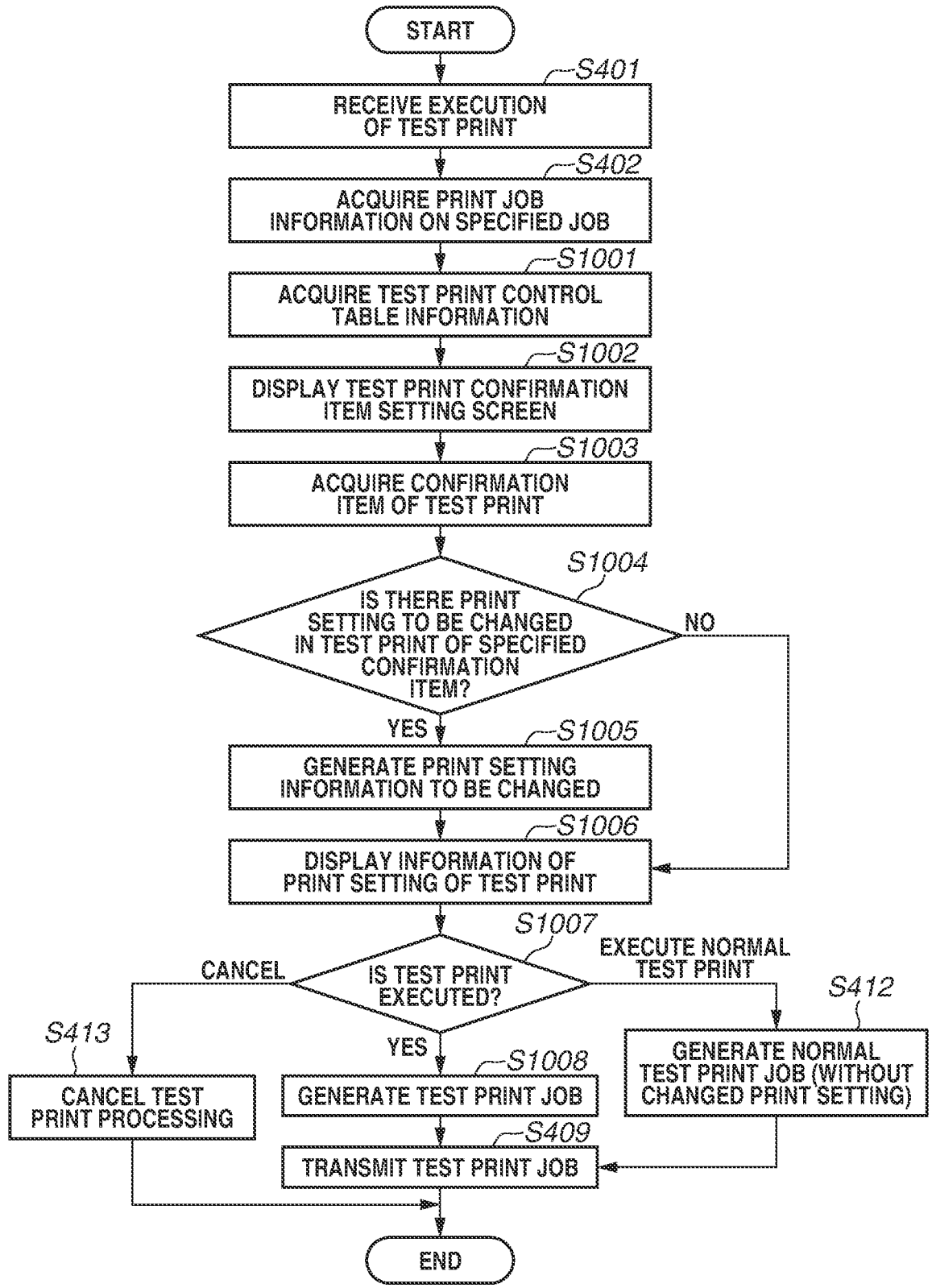
FIG. 10 is a flowchart illustrating test print execution processing according to one or more aspects of the present disclosure.

FIG. 10 is a flowchart illustrating an example of test print execution processing in the print workflow application 301 according to the second exemplary embodiment. That is, the processing of this flowchart is realized by the CPU 201 of the information processing apparatus 101 loading the print workflow application 301 stored in the HDD 204 into the RAM 203 as necessary and executing the application. The identical steps as those in FIG. 5 are denoted by the identical step numbers, and the description thereof will be omitted.

In the second exemplary embodiment, the print job control unit 304 executes the processing in step S1001 after the processing in step S402. In step S1001, the print job control unit 304 acquires test print control data for confirmation items as illustrated in FIG. 11 via the print job management unit 303.

FIG. 11 is a diagram illustrating an example of a test print control table for confirmation items stored in the test print control data 308 in the second exemplary embodiment.

The test print control table for confirmation items defines print settings to be changed at the time of test print for each confirmation item. For example, in order to confirm "color", it is defined that the print setting "printing method (one-sided/two-sided/bookbinding)" is changed to "one-sided", and "stapling", "punching", "saddle stitching", "folding", "case bookbinding", and "cutting (top and bottom/fore-edge)" are changed to "OFF". "N/A" indicates a print setting that is not set in combination. For example, "creep correction" is a setting for bookbinding saddle stitching, and thus items that cannot be set in combination, such as stapling and punching, are set to "N/A".

In the test print control table for confirmation items, the print setting "page" indicates whether a print target page can be limited to a specific page range. When the value of "page" is defined as "specific", it indicates that it can be limited to a specific page range.

In step S1002, the print job control unit 304 displays the test print confirmation item setting screen on the display 207 via the UI unit 302.

Figure 12C:
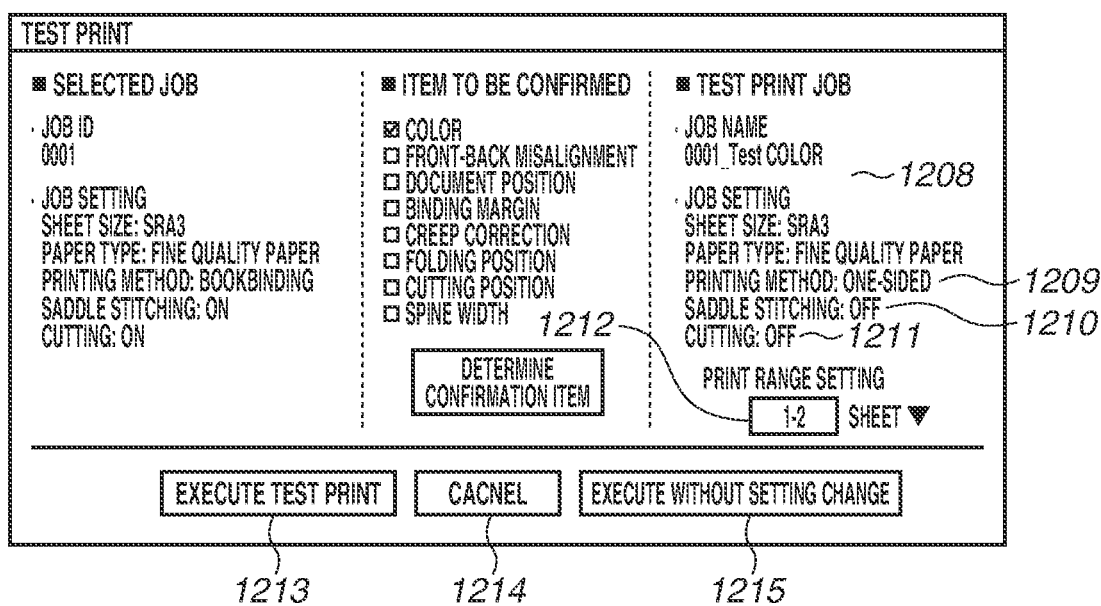

FIGS. 12A, 12B, and 12C are diagrams illustrating an example of the test print confirmation item setting screen according to the second exemplary embodiment.

The test print confirmation item setting screen displayed in step S1002 described above is in the state as illustrated in FIG. 12A.

A display area 1201 indicates a display area for displaying information on a print job targeted for test print. In the display area 1201, information on the print job acquired via the print job management unit 303 in step S402 described above is displayed. In this example, a print job having job ID "0001" is specified as a test print target, and it is displayed that the print settings of the print job are "SRA3" for sheet size, "fine quality paper" for paper type, "bookbinding" for print setting, "ON" for saddle stitching, and "ON" for cutting. A check box 1202 indicates a check box for specifying an item to be confirmed in test print. Illustrated examples here can be specified as confirmation items including a color, a front-back misalignment, a document position, a binding margin, creep correction, a folding position, a cutting position, and a spine width.

In step S1003, the print job control unit 304 acquires information on the confirmation items for test print specified by the print operator via the UI unit 302. The state in which the print operator has specified the confirmation items for test print is the state as that illustrated in FIG. 12B. Here, an example is illustrated in which "color" 1203 is specified as the confirmation item of the test print in the check box 1202 of the confirmation item. When a confirmation item determination button 1204 is pressed after the confirmation item is specified, the confirmation item for test print is confirmed. At this time, the print job control unit 304 acquires information (in this example, information indicating that the "color" 1203 has been specified) specified in the confirmation item for test print in the print job control unit 304 via the UI unit 302.

In step S1004, the print job control unit 304 determines whether the print setting is changed according to the confirmation item of the test print specified in step S1003 described above. Specifically, using the print job information data acquired in step S402 and the test print control table for the confirmation items acquired in step S1001, the print job control unit 304 determines whether it is necessary to change the print setting of the test print in the confirmation items of the test print acquired in step S1003.

FIG. 13 is a diagram illustrating a processing example of changing print setting of test print according to a confirmation item in the second exemplary embodiment. For example, a case where the specified test print job has job ID "0001" and the confirmation item is "color" will be specifically described.

It is assumed that the specified test print job has job ID "0001" and a corresponding merchandise name "saddle stitched_A4_two-sided_landscape" is acquired from the print job information data (FIGS. 6 and 7). As indicated as a print setting 1301, the settings of this print job are "SRA3"

for sheet size, "fine quality paper" for paper type, "bookbinding" for printing method (one-sided/two-sided/bookbinding), "ON" for saddle stitching, and "ON" for cutting (top and bottom/fore-edge). In contrast, information (indicated as information 1302) of print settings to be changed at the time of test print corresponding to the confirmation item "color" is acquired from the test print control table (FIG. 11) for the confirmation item. Both print settings are then compared to determine whether there is a print setting to be changed. In the example illustrated in FIG. 13, there are one or more print settings to be changed, such as from "bookbinding" to "one-sided" for the printing method (one-sided/two-sided/bookbinding), from "ON" to "OFF" for the saddle stitching, and from "ON" to "OFF" for the cutting (top and bottom/fore-edge), as indicated at 1303. It is therefore determined that there are print settings to be changed. The print setting page "specific" means specification of a specific page range is received from the print operator to enable a change in print range, and thus the present setting value is also determined to be the print setting to be changed at the time of test print. A method of specifying the page range will be described below.

In step S1004 described above, if there is a print setting to be changed (YES in step S1004), the processing proceeds to step S1005. If there is no print setting to be changed (NO in step S1004), the processing proceeds to step S1006.

In step S1005, the print job control unit 304 generates print settings of test print based on the confirmation items, and the processing proceeds to step S1006. In the example of FIG. 13, the print job control unit 304 generates a print setting 1303 of test print with changed print settings, based on a print setting 1301 of the original print job and information 1302 of the print setting to be changed at the time of test print corresponding to the confirmation item. In the confirmation of "color", the printing method is changed to "one-sided", and "saddle stitching" and "cutting (top and bottom/fore-edge)" are changed to OFF. As indicated at 1303, the print job control unit 304 therefore generates print settings of test print from the print setting 1301 of the original print job such that the print method is changed to "one-sided" and "saddle stitching" and "cutting (top and bottom/fore-edge)" are changed to OFF. Regarding the print setting "page" in the print setting 1303, a page range may not be set automatically in the system, but a value input by a print setting range control 1212 illustrated in FIG. 12C described below may be set.

In step S1006, the print job control unit 304 displays print setting information for test print on the test print confirmation item setting screen via the UI unit 302. FIG. 12C illustrates a state in which the print setting information of the test print is displayed in a case where "color" is specified as the confirmation item of the test print.

In FIG. 12C, information 1208 indicates a display area in which information on print settings of test print is displayed. It is displayed that the job name is "0001_Test color", and the contents of the print setting 1303 for test print generated in step S1005 are displayed for the print setting. The job name of the test print may be generated automatically in the system according to the confirmation items from the job name of the original print job. In FIG. 12C, "_Test color" is added to the tail of the original print job name so that it can be determined that it is for color confirmation. In a case where a value of page "specific" is set in the information 1302 of the print setting to be changed at the time of test print, the print setting range control 1212 for setting a print setting range is displayed, and specification of the page range is received from the print operator. The information 1208 of the print setting for test print may be editable by the print operator after being set automatically by the system. From the information 1208 of the print setting for test print in FIG. 12C, the operator can confirm, in the test print, the print setting to be changed. Specifically, it can be confirmed that the printing method is changed from "bookbinding" to "one-sided" (1209), the saddle stitching is changed from "ON" to "OFF" (1210), and the cutting is changed from "ON" to "OFF" (1211). Only the print setting to be changed for test print may be displayed in the information 1208 of the print setting for test print.

In step S1007, the print job control unit 304 determines whether to execute test print. When a test print execute button 1213 is pressed on the test print confirmation item setting screen, the print job control unit 304 determines to execute test print in which the print setting is changed according to the confirmation item (YES in step S1007), and the processing proceeds to step S1008.

In step S1008, the print job control unit 304 generates a print job for test print. Specifically, the print job control unit 304 generates a job ticket corresponding to the print setting 1303 of the test print generated according to the confirmation item of the test print. Since the print job is for test print, the number of copies of the job ticket is set to "1". After the processing of step S1008, the print job control unit 304 causes the processing to proceed to step S409.

If a cancel button 1214 is pressed on the test print confirmation item setting screen, the print job control unit 304 determines that it is a cancel instruction for the test print (CANCEL in step S1007), and the processing proceeds to step S413.

If an execute button 1215 is pressed without changing the setting on the test print confirmation item setting screen, the print job control unit 304 determines that normal test print without changed print settings is executed (EXECUTE NORMAL TEST PRINT in step S1007), and the processing proceeds to step S412.

By executing the above-described processing, the test print can be executed in which the print setting is changed to the optimum print setting according to the item to be confirmed by the print operator using the output product of the test print. In the example described above, a case has been described where one confirmation item of test print is selected, but a plurality of confirmation items may be selectable.

FIG. 14 is a diagram illustrating an example of the test print confirmation item setting screen in a case where a plurality of confirmation items is specified. Here, two items (e.g., creep correction 1401 and cutting position 1402) are specified as confirmation items. In this case, a corresponding test print job is generated based on the processing described above, for each of the specified confirmation items. That is, if a plurality of confirmation items for test print is selected, a plurality of test print jobs is also generated. Here, an example is illustrated in which a test print job 1403 for creep correction confirmation and a test print job 1404 for cutting position confirmation are generated and displayed, and two test print jobs are transmitted by execution of test print. It is assumed that the operator instructs "advanced setting display" 1405 to display the print setting changed in the test print. However, the print setting changed in the print job 1403 and the print setting changed in the test print job 1404 may be displayed under the respective job names.

Even in the format of the test print control table (FIG. 8) described in the first exemplary embodiment, a change of print settings of a plurality of patterns may be defined for the merchandise name "saddle stitched_A4_two-sided_landscape", and a plurality of test print jobs may be generated accordingly. For example, a test print job for changing "printing method" to "one-sided" as Pattern 1 and a test print job for changing "cutting" to "OFF" as Pattern 2 may be generated and transmitted to the image forming apparatus.

As for the plurality of generated test print jobs, the print operator may be allowed to select and execute the test print of a print target. By enabling transmission of a plurality of test prints corresponding to a plurality of confirmation items selected by the print operator, it is possible to print an output product in which the plurality of confirmation items can be confirmed by one test print operation.

In the present exemplary embodiment, an example has been described in which test print is generated according to the confirmation item specified by the print operator. However, the system may automatically select the confirmation item according to the print setting of the print job for which test print is performed.

In the third exemplary embodiment, processing of combining print settings of a plurality of test prints generated for a plurality of confirmation items specified by the print operator into one will be described. Description of the configuration identical to those of the first exemplary embodiment and the second exemplary embodiment will be omitted.

Figure 15:
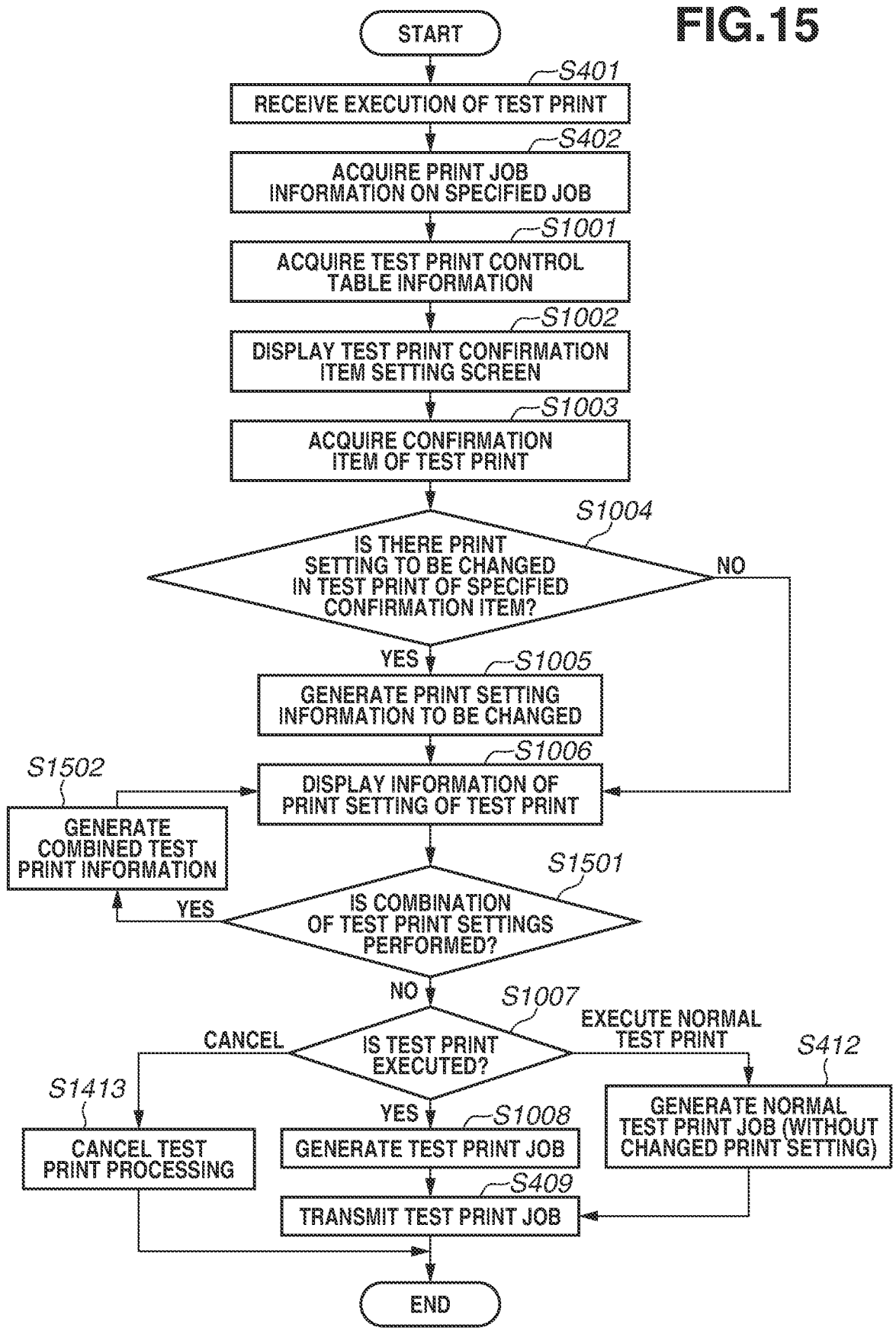
FIG. 15 is a flowchart illustrating test print execution processing according to one or more aspects of the present disclosure.

FIG. 15 is a flowchart illustrating an example of test print execution processing in the print workflow application 301 according to the third exemplary embodiment. That is, the processing of this flowchart is realized by the CPU 201 of the information processing apparatus 101 loading the print workflow application 301 stored in the HDD 204 into the RAM 203 as necessary and executing the application. The identical steps as those in FIGS. 5 and 10 are denoted by the identical step numbers, and the description thereof will be omitted.

In the third exemplary embodiment, the print job control unit 304 executes the processing in step S1501 after the processing in step S1006. In step S1501, the print job control unit 304 determines whether to combine print settings of a plurality of test prints.

FIGS. 16A and 16B are diagrams illustrating an example of the test print confirmation item setting screen according to the third exemplary embodiment.

In the example of FIG. 16A, two items, e.g., "color" 1601 and "front-back misalignment" 1602, are specified as the items to be confirmed in the test print. A test print job (job name: 0001_Test color) 1603 corresponding to the "color" 1601 and a test print job 1604 (job name: 0001_Test front and back) corresponding to the "front-back misalignment" 1602 are generated.

A button 1605 for combining test prints is a button for performing a combination instruction for combining a plurality of generated test print jobs into one. By selecting a plurality of test print jobs to be combined and pressing the button 1605 for combining test prints, it is possible to generate one combined test print job. When receiving from the print operator via the UI unit 302 that the button 1605 for combining test prints has been pressed, the print job control unit 304 determines that an instruction to combine the print settings of test print has been performed (YES in step S1501), and the processing proceeds to step S1502. In contrast, in a case where execution, cancellation, or the like of the test print is executed without an instruction to combine the print settings of the test print (NO in step S1501), the processing of the print job control unit 304 proceeds to step S1007.

In step S1502, the print job control unit 304 generates a print setting for new test print obtained by combining print settings of a plurality of test prints.

Figure 17:
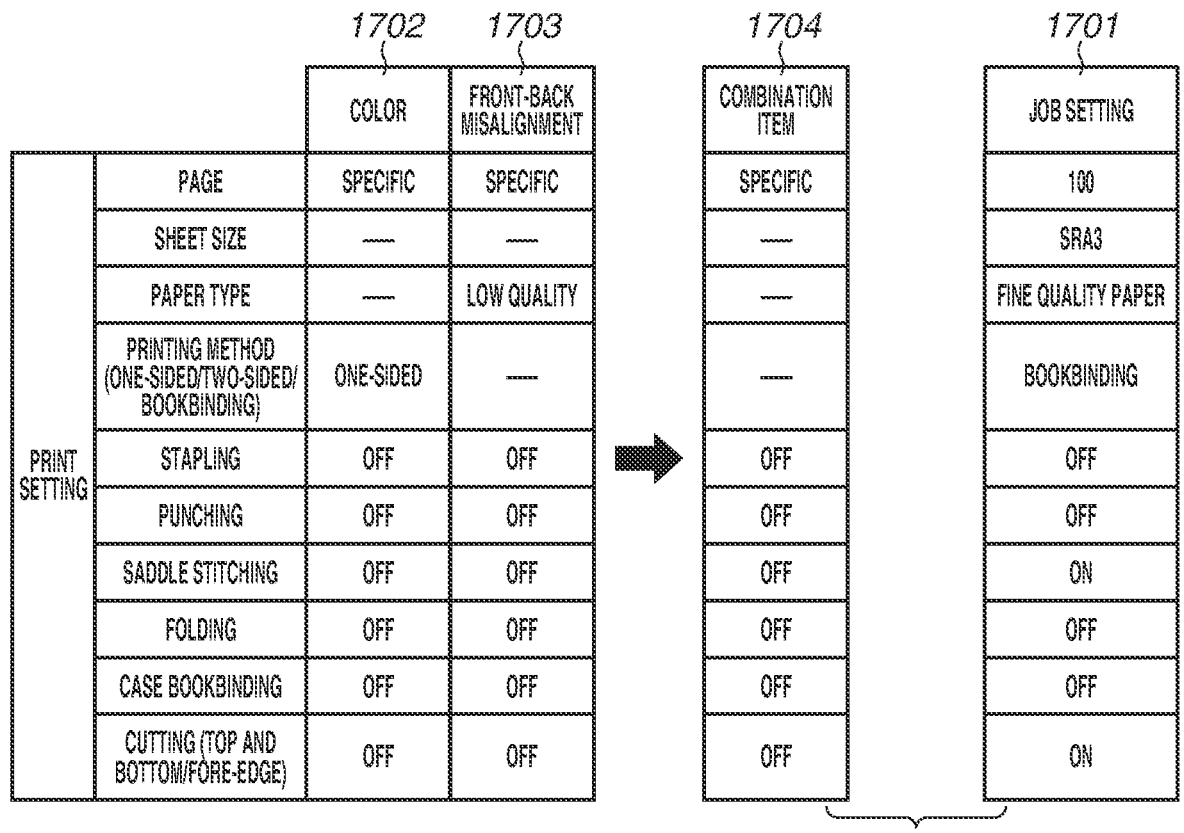
FIG. 17 is a diagram illustrating a generation process example of print settings of test print combined into one according to a plurality of confirmation items according to one or more aspects of the present disclosure.

FIG. 17 is a diagram illustrating a generation process example of print settings of test print combined into one according to a plurality of confirmation items in the third exemplary embodiment.

It is assumed that the specified test print job has job ID "0001" and a corresponding merchandise name "saddle stitched_A4_two-sided_landscape" is acquired from the print job information data (FIGS. 6 and 7). As indicated as a print setting 1701, the settings of this print job are "SRA3" for paper size, "fine quality paper" for paper type, "bookbinding" for printing method (one-sided/two-sided/bookbinding), "ON" for saddle stitching, and "ON" for cutting (top and bottom/fore-edge). It is also assumed that the confirmation items for test print are "color" and "front-back misalignment".

In this case, the print job control unit 304 acquires information (indicated at 1702) of print setting to be changed at the time of test print corresponding to the confirmation item "color" from the test print control table (FIG. 11) for the confirmation item. Information (indicated at 1703) of print setting to be changed at the time of test print corresponding to the confirmation item "front-back misalignment" is acquired. Here, the print job control unit 304 combines the acquired plurality of pieces of information (1702 and 1703) of print settings to be changed at the time of test print, and generates information (indicated at 1704) of print setting to be changed in order to confirm both "color" and "front-back misalignment".

As the combination processing, both pieces of print setting information may be compared, and if the values are different, the value may be determined according to the priority. For example, in a case where the paper type of "color" 1702 is "-" (no change) and the paper type of "front and back" 1703 is "low quality", "-" (no change) has a higher priority, and thus the paper type of the combined print setting information 1704 is "-" (no change). In this case, the paper type may be changed to low quality for confirmation of "front and back". However, the paper type should not be changed in order to confirm "color". A setting that does not change the paper type is therefore prioritized in order to simultaneously confirm "color" and "front and back". These priorities may be defined and used in a system fixed manner, but the definition may also be changed by the operator.

The print job control unit 304 generates the print setting information 1704 of the print setting to be changed that is combined according to the confirmation item. Thereafter, the print job control unit 304 generates the print setting 1705 of test print in which the print setting is changed from the print setting 1701 of the original print job and the print setting information 1704 of the print setting to be changed. In the confirmation of "color" and "front-back misalignment", "saddle stitching" and "cutting (top and bottom/fore-edge)" are changed to OFF. Print settings for test print in which "saddle stitching" and "cutting (top and bottom/fore-edge)" are changed to OFF are thereby generated from the original print setting 1701 as indicated at the print setting 1705 of test print.

After generating the print setting 1705 of the test print in which the print setting is changed, in step S1006, the print job control unit 304 displays the print setting information on the test print generated in step S1502 described above on the test print confirmation item setting screen as illustrated in FIG. 16B.

The example illustrated in FIG. 16B corresponds to a state in which the test print jobs 1603 and 1604 illustrated in FIG. 16A are combined and a test print job 1606 is generated.

The test print job 1606 is a print job in which the two confirmation items, e.g., "color" and "front-back misalignment", are changed to a print setting that can be confirmed. In this example, the job name of the combined print job is automatically generated in the system according to the confirmation item. The example illustrated in FIG. 16B indicates an example in which "_Test color_front and back" is added to the tail of the original print job name so that it can be determined as test print for confirming "color" and "front-back misalignment". It is assumed that the operator instructs "advanced setting display" 1607 to display the print setting changed in the print job 1606. However, in the print job 1606, the print setting to be changed from the print job having job ID "0001" may be displayed under the job name of the print job 1606. In addition, a button (not illustrated) for canceling combination of test prints may be arranged on the test print confirmation item setting screen, and a function of canceling the combined test print job and returning the combined test print job to the individual test print jobs before combination may be executable.

By executing the above processing, a plurality of test print jobs generated for a plurality of confirmation items specified by the print operator can be combined into one test print job. It is thus not necessary to perform test print for the number of confirmation items, in a case where there is a plurality of confirmation items, and test print can thereby be executed after adjusting the number to an optimum number by the print operator. In the present exemplary embodiment, the example of combining the test prints specified by the print operator has been described, but the test print may be combined by determining a confirmation item that can be automatically combined by a system.

As described above, according to each exemplary embodiment, the print operator can confirm and execute the test print in which the print setting is automatically changed to the optimum print setting according to the type of print setting of the output product to be printed and the item desired to be confirmed by the print operator. In addition, it is not necessary to perform test print by canceling specific print settings such as cutting from the print settings, or it is not necessary to perform resetting to restore the print settings at the time of actual printing. It is thus possible to reduce the burden on the print operator and prevent a mistake such as forgetting of resetting. Furthermore, the print operator can confirm the content of the print setting to be changed at the time of executing test print, and it is also possible to suppress a printing mistake and erroneous determination due to confusion with test print of the same print setting as the actual printing.

That is, the operator can confirm and execute the test print in which the print setting is automatically changed to the optimum print setting according to the type of print setting of the output product to be printed and the item desired to be confirmed by the operator. It is thus possible to suppress an error such as forgetting of resetting or erroneous determination by the operator.

The configuration and the contents of the various data described above are not limited thereto, and various configurations and contents are used depending on the application and purpose.

Although one exemplary embodiment has been described above, the present disclosure can be implemented as, for example, a system, an apparatus, a method, a program, or a storage medium. Specifically, the present exemplary embodiment may be applied to a system including a plurality of devices, or may be applied to an apparatus including one device.

In addition, all configurations obtained by combining the above exemplary embodiments are also included in the present disclosure.

The present disclosure can also be realized by processing in which a program for realizing one or more functions of the above-described exemplary embodiments is supplied to a system or an apparatus via a network or a storage medium, and one or more processors in a computer of the system or the apparatus read and execute the program. In addition, the present exemplary embodiment can also be implemented by a circuit (e.g., application specific integrated circuit (ASIC)) that implements one or more functions.

In addition, the present disclosure may be applied to a system including a plurality of devices, or may be applied to an apparatus including one device.

The present disclosure is not limited to the exemplary embodiments described above, and various modifications (including organic combinations of the exemplary embodiments) can be made based on the gist of the present disclosure, and these modifications are not excluded from the scope of the present disclosure. That is, all configurations obtained by combining the exemplary embodiments described above and modifications thereof are also included in the present disclosure.

According to the exemplary embodiments described above, it is possible to confirm and execute test print automatically changed to an optimum print property according to a type of print property of an output product to be printed and an item desired to be confirmed by an operator, and to suppress an error such as forgetting of resetting or erroneous determination by the operator.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-183453, filed Nov. 2, 2020, which is hereby incorporated by reference herein in its entirety.

What is claimed is:

1. An information processing apparatus comprising:
at least a memory coupled to at least one processor and having instructions stored thereon, wherein the instructions, when executed by the at least one processor, cause the information processing apparatus to act as:
a holding unit configured to hold a table in which a print setting to be changed when test print is performed is defined;
a control unit configured to receive an instruction to execute test print to be performed to confirm an output result in a case where a first job is executed by an image forming apparatus;
a generation unit configured to generate a second print job obtained by changing a print setting of a first print job based on the table in response to receiving the instruction to execute test print without a user operation to change the print setting; and
a transmission unit configured to transmit the second print job generated by the generation unit to the image forming apparatus,
wherein in a case where a plurality of the second print jobs can be generated, the generation unit generates a third print job obtained by combining the plurality of the second print jobs into one print job,
wherein the display unit displays information on a print property to be changed from the first print job when the generation unit generates the third print job, and
wherein the transmission unit transmits the third print job generated by the generation unit to the image forming apparatus.

2. The information processing apparatus according to claim 1, further comprising a reception unit configured to receive specification of a confirmation item to be confirmed in the test print from a user, wherein the generation unit changes the print property of the first print job and generates the second print job by using the specification of the confirmation item received by the reception unit and information defining a print property to be changed in test print for each confirmation item.

3. The information processing apparatus according to claim 2, wherein the generation unit generates one or more second print jobs for the first print job.

4. The information processing apparatus according to claim 3, wherein in a case where specification of a plurality of confirmation items is received from a user by the reception unit, the generation unit generates a second print job for each of the specified confirmation items.

5. The information processing apparatus according to claim 1, wherein the generation unit, in a case where a plurality of the second print jobs is generated, receives a combination instruction to combine the plurality of generated second print jobs and, in a case where the combination instruction is received, generates the third print job by performing the combination.

6. The information processing apparatus according to claim 1, wherein the print property includes a property regarding post-processing of a printed sheet.

7. The information processing apparatus according to claim 1, further comprising a display unit configured to display a print setting to be changed when the generation unit generates the second print job.

8. The information processing apparatus according to claim 1,
wherein the table is a table in which a print setting to be changed when test print is performed is defined for each merchandise, and
wherein the generation unit generates the second print job by changing a print setting of the first print job based on merchandise information about the first print job and the table.

9. A method of controlling an information processing apparatus, the method comprising:
holding a table in which a print setting to be changed when test print is performed is defined;
receiving an instruction to execute test print to be performed to confirm an output result in a case where a first job is executed by an image forming apparatus;
generating a second print job by changing a print setting of a first print job based on the table in response to receiving the instruction to execute test print without a user operation to change the print setting; and
transmitting the second print job generated in the generating to the image forming apparatus,
wherein in a case where a plurality of the second print jobs can be generated, a third print job obtained by combining the plurality of the second print jobs into one print job is generated,
wherein the information is displayed on a print property to be changed from the first print job when the third print job is generated, and
wherein the third print job generated is transmitted to the image forming apparatus.

10. The method of controlling an information processing apparatus according to claim 9, comprising receiving specification of a confirmation item to be confirmed in the test print from a user, wherein the generating changes the print property of the first print job and generates the second print job by using the specification of the confirmation item received by the receiving and information defining a print property to be changed in test print for each confirmation item.

11. The method of controlling an information processing apparatus according to claim 10, wherein the generating generates one or more second print jobs for the first print job.

12. The method of controlling an information processing apparatus according to claim 11, wherein in a case where specification of a plurality of confirmation items is received from a user in the receiving, the generating generates a second print job for each of the specified confirmation items.

13. The method of controlling an information processing apparatus according to claim 11,
wherein in a case where a plurality of the second print jobs can be generated, the generating generates a third print job obtained by combining the plurality of the second print jobs into one print job,
wherein the displaying displays information on a print property to be changed from the first print job when the generating generates the third print job, and
wherein the transmitting transmits the third print job generated in the generating to the image forming apparatus.

14. The method of controlling an information processing apparatus according to claim 13, wherein the generating, in a case where a plurality of the second print jobs is generated, receives a combination instruction to combine the plurality of generated second print jobs and, in a case where the combination instruction is received, generates the third print job by performing the combination.

15. The method of controlling an information processing apparatus according to claim 9, wherein the print property includes a property regarding post-processing of a printed sheet.

16. The method according to claim 9, further comprising displaying a print setting to be changed when the second print job is generated.

17. The method according to claim 9,
wherein the table is a table in which a print setting to be changed when test print is performed is defined for each merchandise, and
wherein the second print job is generated by changing a print setting of the first print job based on merchandise information about the first print job and the table.

* * * * *